(12) United States Patent
Goel et al.

(10) Patent No.: US 12,464,025 B2
(45) Date of Patent: Nov. 4, 2025

(54) ACCESS CONTROL POLICY ANALYSIS IN A MULTI-PROVIDER NETWORK ENVIRONMENT

(71) Applicant: Amazon Technologies, Inc., Seattle, WA (US)

(72) Inventors: Amit Goel, Portland, OR (US); Chengpeng Li, Austin, TX (US); Chungha Sung, Cupertino, CA (US); Loris D'Antoni, Madison, WI (US); Neha Rungta, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 120 days.

(21) Appl. No.: 18/371,034

(22) Filed: Sep. 21, 2023

(65) Prior Publication Data

US 2025/0106256 A1    Mar. 27, 2025

(51) Int. Cl.
*H04L 9/40*    (2022.01)
*H04L 43/50*   (2022.01)

(52) U.S. Cl.
CPC ............. *H04L 63/20* (2013.01); *H04L 43/50* (2013.01); *H04L 63/101* (2013.01)

(58) Field of Classification Search
CPC ........ H04L 63/20; H04L 43/50; H04L 63/101
See application file for complete search history.

(56) References Cited

U.S. PATENT DOCUMENTS

| | | | |
|---|---|---|---|
| 2022/0030036 A1* | 1/2022 | Cirelli | ................... H04L 63/205 |
| 2022/0156614 A1* | 5/2022 | Dalli | ...................... G06N 5/048 |
| 2022/0191253 A1 | 6/2022 | Rungta et al. | |
| 2022/0318059 A1 | 10/2022 | Cook et al. | |
| 2024/0249008 A1* | 7/2024 | Inokuchi | ................. G06F 21/62 |

OTHER PUBLICATIONS

International Search Report and Written Opinion, PCT App. No. PCT/US2024/046034, Dec. 9, 2024, 13 pages.

* cited by examiner

*Primary Examiner* — Benjamin M Thieu
(74) *Attorney, Agent, or Firm* — Nicholson De Vos Webster & Elliott LLP

(57) ABSTRACT

Techniques for analyzing access control policies across multiple provider networks. These techniques compile various policies into a unified policy language broad enough to include diverse policy features, yet specific enough for automated analysis. An automated differential testing method is employed to confirm the accuracy of this compilation by generating access requests, ensuring both original and translated policies consistently grant or deny access. Moreover, an abstraction technique is used to simplify and correlate the complex details of different policies, enabling easier user inquiries about them. For instance, users can determine if an account has write access in one network but not in another. This abstraction sometimes involves replacing actions in original policies, ensuring their compatibility in the target policy language.

20 Claims, 12 Drawing Sheets

IDENTITIES

POLICIES

RESOURCES

ACCESS CONTROL POLICY ANALYSIS IN A MULTI-PROVIDER NETWORK ENVIRONMENT

BACKGROUND

A multi-provider network environment refers to the utilization of multiple provider network computing services from two or more provider network vendors. This strategy can involve using public, private, or hybrid provider networks to accomplish various objectives. Multi-provider network environments are becoming increasingly prevalent as organizations seek to optimize performance, resilience, and cost, while also avoiding vendor lock-in.

One potential drawback of a multi-provider network strategy is the complexity of managing resources, security, and operations across different environments. Organizations that employ a multi-provider network strategy would appreciate tools and platforms that help centralize and streamline multi-provider network management.

BRIEF DESCRIPTION OF DRAWINGS

Various examples in accordance with the present disclosure will be described with reference to the drawings, in which.

DETAILED DESCRIPTION

Figure 1:
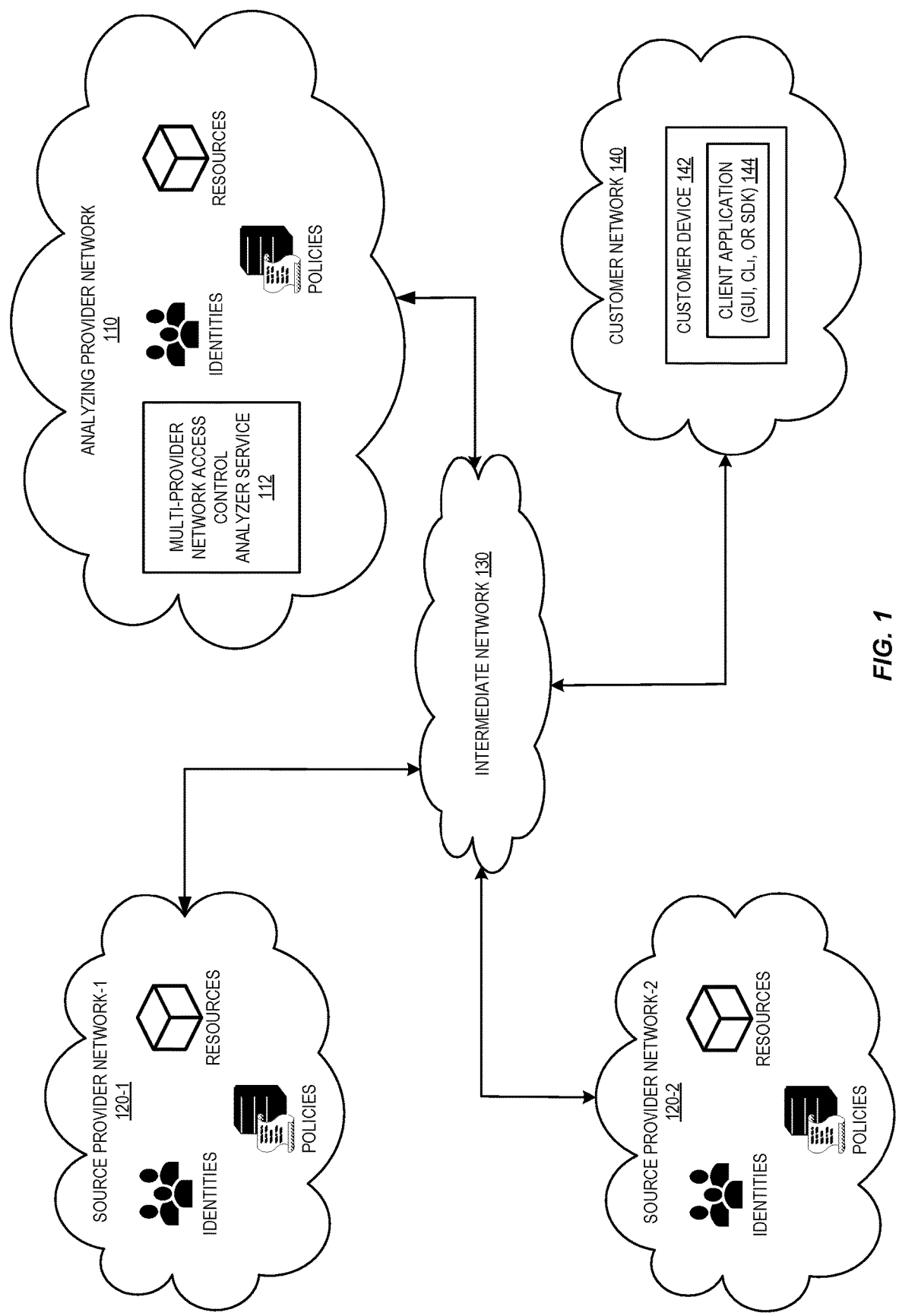
FIG. 1 illustrates an example of a multi-provider network environment.

The present disclosure relates to systems, methods, and non-transitory computer-readable storage media (collectively referred to as "techniques") for access control policy analysis in a multi-provider network environment. The techniques compile various policies into a unified policy language broad enough to include diverse policy features, yet specific enough for automated analysis. An automated differential testing method is employed by the techniques to confirm the accuracy of this compilation by generating access requests, ensuring both original and translated policies consistently grant or deny access. Moreover, an abstraction technique is used to simplify and correlate the complex details of different policies, enabling easier user inquiries about them. For instance, users can determine if an account has write access in one network but not in another. This abstraction sometimes involves replacing actions in original policies, ensuring their compatibility in the target policy language.

General Overview

In the context of a provider network environment, an access control policy (ACP) defines who can access specific resources and what operations they are allowed to perform on those resources. The resources can be anything from cloud-based applications, databases, storage buckets, virtual machines, to network configurations. The policy ensures that only authorized users or entities can interact with these resources in a defined manner, thereby maintaining the security and integrity of the data and the provider network environment.

Different provider networks may use different access control policy architectures. Some examples of different access control policy architectures are identity-based policies, resource-based policies, role-based access control, and attribute-based access control. Not only do different provider networks use different access control policy architectures, but they also use different access control policy languages. While each language provides a structured and formalized way to define and express security requirements for resources and each language can be used to specify who can access which resources and under what conditions, the complexity and capabilities of each language vary. For example, different policy languages may have different language formats, structures, granularities, flexibility, application scope, and features. Overall, the design, structure, and features of policy languages used to provide granular control over resources in different provider networks are distinct.

The different access control policy architectures and languages present challenges to users of provider networks. For example, an organization may wish to migrate their access control policies from one provider network to another, or an organization may wish to use multiple provider networks. Because of the architectural and language differences, it is challenging for provider network users to design access control policies for multi-provider network environments. For the same reasons, it is challenging for provider network users to reason about access control privileges across multiple provider networks.

Techniques are disclosed that address these and other issues. In some examples, the techniques analyze access control policies across multiple provider networks. This is achieved by compiling the policies into a single access control policy language. This language is general enough to encompass the features of various policy architectures and languages but is still restrictive enough to permit automated concrete analysis of the policies. Besides converting policies into this target language for automated analysis, some techniques employ an automated differential testing method. This method validates the accuracy of the compiled provider network policies into the target policy language. This automated differential testing process generates access requests to ensure both the source policies and the translated policy consistently allow or deny access.

Additionally, or alternatively, certain techniques utilize an abstraction method. This method links policy analysis questions to the target policy language. The abstraction process allows for the simplification of the detailed elements of the varied access control policies across different provider networks. As a result, users can easily answer policy analysis questions regarding these different policies. An example question might be: "Is there an account that has write access to a resource on one provider network, but lacks write access to the resource on another provider network?" In certain instances, the abstraction method involves substituting various actions in the source policies with an abstraction. This ensures their representations in the target policy language are aligned and can be compared.

FIG. 1 illustrates an example of a multi-provider network environment. Multi-provider network environment 100 refers to the use by a customer of multiple provider networks 110, 120-1, and 120-2 from different provider network service providers. The customer may be an individual, organization, or entity that uses or subscribes to services offered by multiple provider networks to fulfill their information technology (IT) and business needs. Instead of relying on a single provider network, the customer distributes their workloads, applications, and data across multiple provider networks 110, 120-1, and 120-2. The customer may use a mix of provider network services from different provider networks 110, 120-1, and 120-2 for various reasons including for cost savings, for performance optimization, for risk mitigation, or for regulatory compliance.

Provider network 110, source provider network-1 120-1, and source provider network-2 120-2 are each a provider network. An example of a provider network will now be described. A provider network, often referred to as a "cloud" provider network, extends users the capability to leverage a diverse range of computing-related resources. These resources encompass compute elements, such as the execution of virtual machine (VM) instances or containers, undertaking batch jobs, and running code sans the need for server provisioning. Additionally, data and storage resources are encompassed, comprising object storage, block-level storage, archival data storage, databases, and database tables, among others. Network-related assets, like the setup of virtual networks that encompass clusters of compute resources, content delivery networks (CDNs), and Domain Name Service (DNS), are also part of this network. Application resources such as databases and services for application building and deployment are integral components. The network includes provisions for access policies, roles, identity policies, machine images, routers, and various other data processing resources, forming a comprehensive suite of capabilities offered to users.

These computing resources, among others, are available through the provider network as services such as multi-provider network access control analyzer service 112. For instance, this includes a hardware virtualization service capable of executing compute instances and a storage service designed to store data objects. The individuals utilizing the provider network, often referred to as "users" or "customers," can make use of one or more user accounts that are linked to a customer account. Although these terms may be used interchangeably depending on the context, they collectively represent the association between users and the provider network. Users can engage with the provider network through intermediary network 130, which could be the internet, utilizing diverse interfaces. These interfaces encompass interacting via application programming interface (API) calls or utilizing a console implemented as a website or application, among other methods.

An API, short for Application Programming Interface, denotes an interface or communication protocol that facilitates interaction between a client and a server. When a client submits a request in a predetermined format, it anticipates receiving a response in a specific format or instigating a predefined action. Within the context of the provider network, APIs serve as gateways enabling customers to access the infrastructure and resources within the network. This access empowers customers to retrieve data from or initiate actions within the provider network, fostering the creation of applications that engage with the resources and services hosted within the network. APIs additionally facilitate the exchange of data among various services within the provider network. These APIs can constitute an integral component of, or operate as a front-end for, the control plane of the provider network. This control plane comprises "backend" services that provide support and enable the more direct delivery of services to customers.

By way of illustration, the provider network typically alludes to an extensive repository of accessible virtualized computing resources, encompassing compute, storage, networking resources, applications, and services. The provider network facilitates streamlined, on-demand network entry to a shared pool of configurable computing resources. These resources can be programmatically allocated and released based on customer directives. The flexibility of these resources enables them to be dynamically provisioned and reconfigured to accommodate fluctuating workloads. In this manner, the provider network can be perceived as encompassing both applications delivered as services over publicly accessible networks (e.g., the Internet, cellular communication networks) and the hardware and software situated within data centers, facilitating the delivery of said services.

The provider network can be structured into multiple regions, where each region designates a geographical area containing a collection of data centers grouped by the cloud provider. Within each region, there are several availability zones (AZs), often numbering two or more, interconnected through a private high-speed network like fiber-optic communication connections. An availability zone, also recognized as a "zone," constitutes an isolated domain for handling failures, encompassing one or more data center facilities. These facilities possess independent power, networking, and cooling mechanisms distinct from those in other AZs. The term "data center" refers to a physical structure or enclosure housing servers of the provider network 130 while providing essential power and cooling. In a region, the positioning of AZs is deliberately spread out, ensuring that the impact of a natural disaster or other failure-causing event does not affect more than one AZ concurrently or disrupt their operations.

Users can establish connections to an availability zone (AZ) within the provider network 130 through publicly accessible networks such as the Internet or cellular communication networks. This connectivity is facilitated, for instance, via transit centers (TCs). TCs function as crucial backbone locations that bridge users and the provider network. These TCs can be strategically positioned at other network provider facilities, such as those managed by Internet service providers (ISPs) or telecommunications providers. They are securely linked through methods like virtual private networks (VPNs) or direct connections to the AZs. Redundancy is upheld through the operation of two or more TCs within each region.

Regions are interconnected via a global network, incorporating private networking infrastructure, often involving fiber connections overseen by the provider network. This network establishes connections between every region and at least one other region. Additionally, the provider network is capable of distributing content from external points of presence (POPs), connected with these regions, using edge locations and regional edge cache servers. Through this organization and geographic dispersion of computing hardware, the provider network effectively furnishes users worldwide with low-latency access to resources, maintaining a robust level of fault tolerance and stability.

To deliver these and other computing resource services, the provider network can rely on virtualization techniques. For instance, virtualization technologies enable users to manage and utilize compute resources. This includes entities like a compute instance, such as a virtual machine (VM) equipped with a guest operating system (O/S) functioning through a hypervisor. The hypervisor might operate independently or on top of an underlying host O/S. Alternately, a container can be employed, possibly functioning within a VM. Additionally, a compute instance capable of operating on bare metal hardware without an underlying hypervisor can also be utilized. Such configurations can be established using a single electronic device.

As a result, a user gains the direct ability to utilize a compute resource hosted by the provider network (e.g., provided by a hardware virtualization service) for a diverse range of computational tasks. Furthermore, it is possible for a user to indirectly leverage a compute resource by submitting code intended for execution by the provider network (e.g., using an on-demand code execution service). The provider network subsequently employs one or more compute resources to execute the code, generally without requiring the user to possess control over or insight into the underlying compute instance(s) involved.

The provider network may offer a service known as a "managed compute service," which operates code execution or furnishes computing resources to users in a supervised setup. Instances of managed compute services encompass diverse options such as an on-demand code execution service, a hardware virtualization service, a container service, and similar alternatives.

An on-demand code execution service (sometimes referred to as a function compute service, functions service, cloud functions service, functions-as-a-service, or serverless computing service) empowers users within the provider network to run their code on cloud resources without the necessity to individually select or oversee the underlying hardware resources responsible for executing the code. For instance, a user can engage an on-demand code execution service by uploading their code and utilizing one or more APIs to request the service to detect, allocate, and administer any necessary resources for code execution. Consequently, in various scenarios, a "serverless" function encompasses code sourced from a user or another entity-potentially including the provider network itself—and can be executed as needed.

Serverless functions can be managed within the provider network through an on-demand code execution service and may be associated with specific users or accounts or made accessible to multiple users/accounts. These functions are often linked with a Uniform Resource Locator (URL), Uniform Resource Identifier (URI), or another reference, which can be utilized to trigger the execution of the serverless function. Execution of a serverless function takes place when it is invoked, with a compute resource like a virtual machine, container, etc., being engaged.

In certain instances, invoking a serverless function can be accomplished through an API call or a specially formatted HyperText Transfer Protocol (HTTP) request message. Consequently, users can define serverless functions that are executed on demand, without necessitating the creation and maintenance of dedicated infrastructure for their execution. Instead, these functions are executed as needed, drawing on resources managed by the provider network. In some scenarios, these resources can be held in a "ready" state, preconfigured with a runtime environment optimized for executing serverless functions. This approach enables the execution of serverless functions almost instantly in near real-time.

A hardware virtualization service (known as an elastic compute service, virtual machines service, computing cloud service, compute engine, or cloud compute service in various implementations) empowers users within the provider network to allocate and oversee compute resources, including virtual machine instances. This virtual machine technology permits the consolidation of multiple servers onto a single physical server, wherein each consolidated server is referred to as a virtual machine. This process is typically facilitated by a hypervisor, which may partly execute on an offload card within the server, such as a card connected via PCI or PCIe to the physical CPUs. Various components of the virtualization host can handle different virtualization management functions. The offload card may incorporate one or more CPUs that are specifically allocated to instance management tasks, such as overseeing virtual machine management (e.g., the hypervisor), input/output virtualization for network-attached storage volumes, local migration management, instance health monitoring, and similar responsibilities.

Virtual machines are often termed compute instances or simply "instances." In the context described, provisioning a virtual compute instance entails reserving resources (such as computational and memory resources) from an underlying physical compute instance for the client. This involves selecting from a pool of available physical compute instances and other resources, installing or launching the necessary software (e.g., an operating system), and subsequently making the virtual compute instance accessible to the client for carrying out tasks specified by the client.

Another form of managed compute service encompasses a container service, specifically a container orchestration and management service. This type of service (known as a container service, cloud container service, container engine, or container cloud service in various implementations) empowers users within the provider network to create and oversee containers. In certain scenarios, this container service can manifest as a KUBERNETES-based container orchestration and management service.

In the context of this document, a container encapsulates code and its associated dependencies, facilitating the swift and dependable execution of an application, which can also be referred to as a task, pod, or cluster across different computing environments. A container image stands as an independent, executable software package encompassing everything essential for initiating an application process: code, runtime, system tools, system libraries, and configurations. At runtime, container images transform into functional containers. Essentially, containers serve as an abstraction at the application layer, implying that each container emulates a distinct software application process. Although each container operates discrete processes, multiple containers can share a common operating system, which can be achieved by launching them within the same virtual machine.

In contrast, virtual machines operate as abstractions at the hardware layer, signifying that each virtual machine simulates a physical machine capable of running software. While multiple virtual machines can coexist on a single physical machine, each virtual machine usually possesses its own instance of an operating system, along with the corresponding applications, files, libraries, and dependencies.

Certain containers can operate on instances equipped with a container agent, while others can be executed on bare-metal servers or on an offload card within a server.

Customer network 140, sometimes referred to as an end-user network, is a network owned and operated by an individual or organization by an individual or organization that uses network services for their own purposes. This network is used by customers of provider networks 110, 120-1, and 120-2 to connect their devices, such as computers, smartphones, and other devices, to the intermediate network 130 (e.g., the internet). The customer network is typically the starting point for data transmission and communication, and it connects to the broader network infrastructure through an Internet Service Provider (ISP) or another type of network service provider.

Intermediate network 130, sometimes referred to as a transit network, is a network that sits between customer network 130 and provider networks 110, 120-1, and 120-2. Intermediate network 130 is responsible for forwarding traffic between different networks and facilitating the flow of data across the internet or other networks. Intermediate network 130 may be owned and operated by internet service providers (ISPs), data centers, and other entities that specialize in routing and transmitting data across large distances.

Customer device 142 refers to any device that is owned and operated by an individual or organization and is connected to their own network 140. These devices 142 are used by end-users for various purposes, such as accessing the internet, sending emails, browsing websites, and running applications. Examples of customer devices 142 include personal computers, laptops, smartphones, tablets, smart TVs, and IoT (Internet of Things) devices like smart thermostats or home security cameras. These devices are part of the customer's network and interact with the Internet through their Internet Service Provider (ISP) and intermediate networks.

Customer devices 142 may be configured with graphical user interface (GUIs), command line interfaces (CLIs), or software development kits (SDKs) for interfacing with provider networks 110, 120-1, and 120-2 via application programming interface (APIs) offered by the provider networks 110, 120-1, and 120-2. In environment 100, customer devices 142 leverage GUIs, CLIs, or SDK to manage, deploy, and interact with resources and services offered by the provider networks 110, 120-1, and 120-2. GUIs provide a visual and user-friendly way for customers to interact with provider network resources and services. Each provider network 110, 120-1, or 120-2 may offer a web-based portal or console that allows users to manage and configure their resources. With GUIs, users can perform tasks like provisioning virtual machines, configuring networking, setting up storage, and managing security settings. CLIs provide a text-based interface for interacting with provider network resources and services. They are useful for automating tasks, scripting, and managing resources in bulk. A provider network may offer a CLI tool that users can install on their customer devices 142. SDKs are sets of programming tools and libraries that developers can use to build applications that interact with provider network services. SDKs offer a more programmatic way to interface with the provider networks 110, 120-1, and 120-2 and their services.

Provider network 110 is termed "analyzing" provider network 110 because it is configured to perform techniques disclosed herein as part of multi-provider network access control analyzer service 112. Provider networks 120-1 and 120-2 are termed "source" provider networks because they are the source of access control policies that are analyzed by analyzing provider network 110 using techniques disclosed herein. It should be understood that a source provider network 120-1 or 120-2 may also have some or all of the policy analysis capabilities of analyzing provider network 110. In that case, provider network 110 might be a source provider network for a provider network 120-1 or 120-2 and the source provider network 120-1 or 120-2 would be an analyzing provider network. While in the example depicted in FIG. 1 there are two source provider networks, environment 100 cloud contain as few as one source provider network or more than two source provider networks.

Provider networks 110, 120-1, and 120-2 each store access control policies that govern access to resources in the provider network. Components of an access control policy include: principals, actions, resources, and conditions. A principal refers to the entity that is allowed or denied access. For example, a principal can be a user, group, or service. An action specifies what operations are allowed or denied. For example, an action can be read, write, delete, etc. A resource identified a specific provider network resource that the policy applies to. A condition specifies a condition under which the policy is in effect. For example, a condition may restrict access based on an internet protocol (IP) address or the time of day.

The access control policies of provider networks 110, 120-1, and 120-2 may be authored (expressed) in different access control policy languages. The languages may differ in their language format. For example, the languages may all use Javascript Object Notation (JSON) where some of the languages express policies using role-based access control (RBAC) definitions. The structure of the languages may also differ. For example, one language may express policies as a set of statements where each statement has attributes like effect, action, resource, or condition. Another language may express policies as a set of if/then rules using. Yet another language may use bindings that connect users, groups, etc. to roles that have permission. Some languages may allow for permissions to be defined down to specific actions on individual resources. Some languages may bundle permissions into roles where the roles are assigned to identities rather than individual permissions. The languages may allow policies to be applied at different scopes of application. For example, some languages may allow policies to be attached directly to users, groups, roles, or resources. Other languages may apply policies at specific scopes such as management groups, subscriptions, resource groups, or individual resources. Still other languages may allow policies to be set at the organization level, folder level, project level, or resource level.

A customer (e.g., an individual or an organization) may have different identities with each provider network they use. This may result from the diverse architectures, frameworks, and business models of the provider networks. For example, a customer may create a unique account with each provider network 110, 120-1, and 120-2 where each provider network has its own sign-up process, account structure, and identifier (e.g., account number, email, or username). Each provider network 110, 120-1, and 120-2 may use its own identity and access management framework. Although the frameworks may serve similar purposes regarding managing user access to resources, they operate differently (e.g., varied authenticated methods) necessitating distinct identities for the same customer across the provider networks 110, 120-1, and 120-2.

The access control policies of the provider networks 110, 120-1, and 120-2 are designed to protect a wide range of resources. These resources may encompass any or all of: virtual machine instances, on-demand compute functions, data storage buckets, data storage volumes, data storage vaults, relational database instances, NoQSL database tables, virtual private clouds, subnets, route tables, network access control lists, notification queues, publish-subscription topics or channels, media streams, users, roles, policies, blob storage, file storage, disk storage, virtual networks, load balancers, network security groups, directory service users, directory service groups, director service roles, director service managed identifies, etc.

Figure 2:
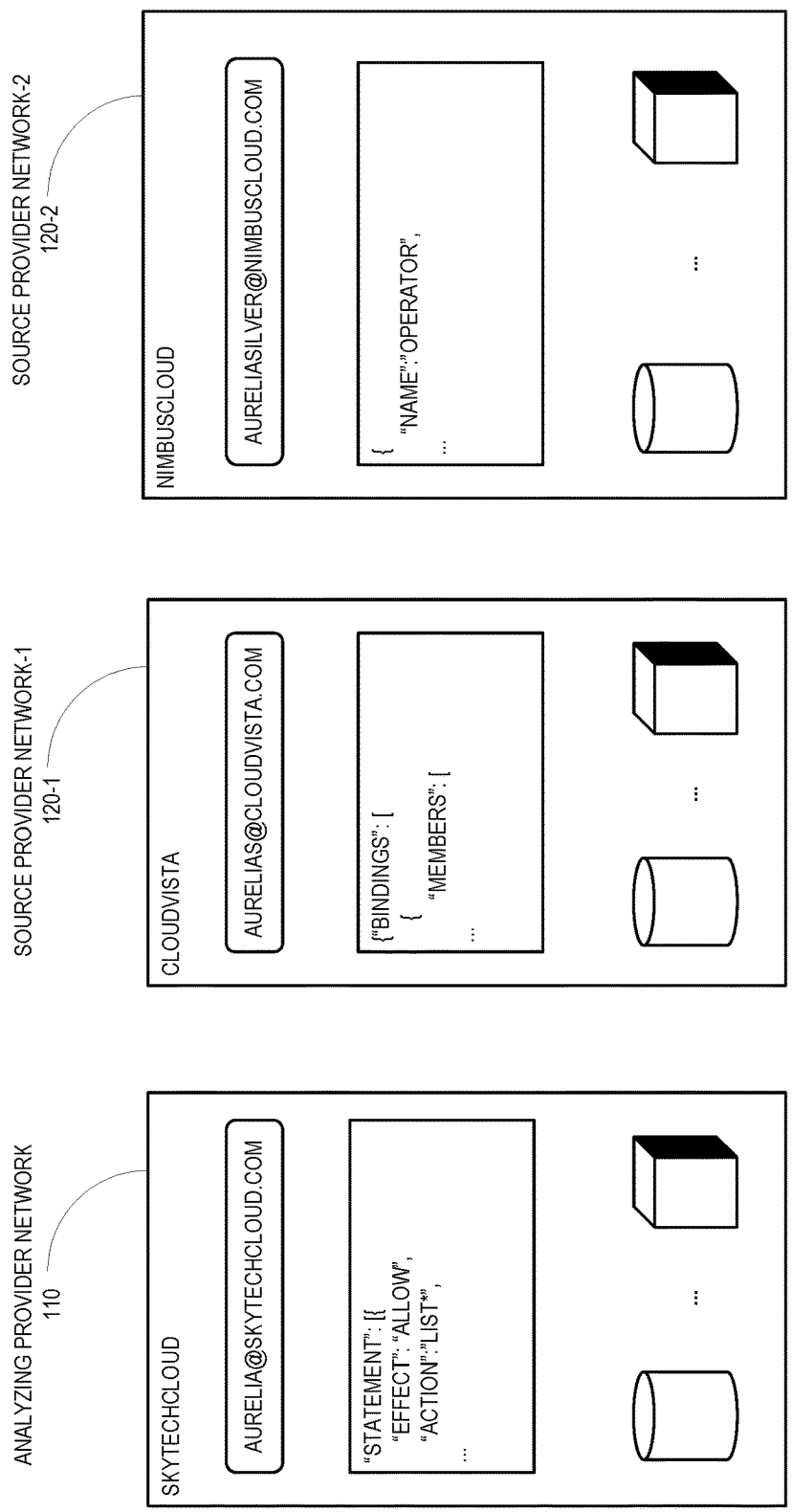
FIG. 2 illustrates an example of how a customer uses multiple provider networks.

FIG. 2 illustrates an example of how a customer uses multiple provider networks. The customer has established a separate identity in each of the provider networks 110, 120-1, and 120-3 such as by creating a customer or user account with the provider network. Each separate identity has a different identifier specific to the provider network with which the identity is established. A set of resources are provisioned to the customer in each of the provider networks 110, 120-1, and 120-2. The customer has also established access control policies with each provider network 110, 120-1, and 120-2. The access control policies are expressed according to different identity and access control frameworks and in different access control policy languages.

As illustrated by FIG. 2, different provider networks may use different access control policy architectures and languages. The different access control policy architectures and languages present challenges to users of provider networks. For example, an organization may wish to migrate their access control policies from one provider network to another, or an organization may wish to use multiple provider networks. Because of the architectural and language differences, it is challenging for provider network users to design access control policies for multi-provider network environments. For the same reasons, it is challenging for provider network users to reason about access control privileges across multiple provider networks.

Figure 3:
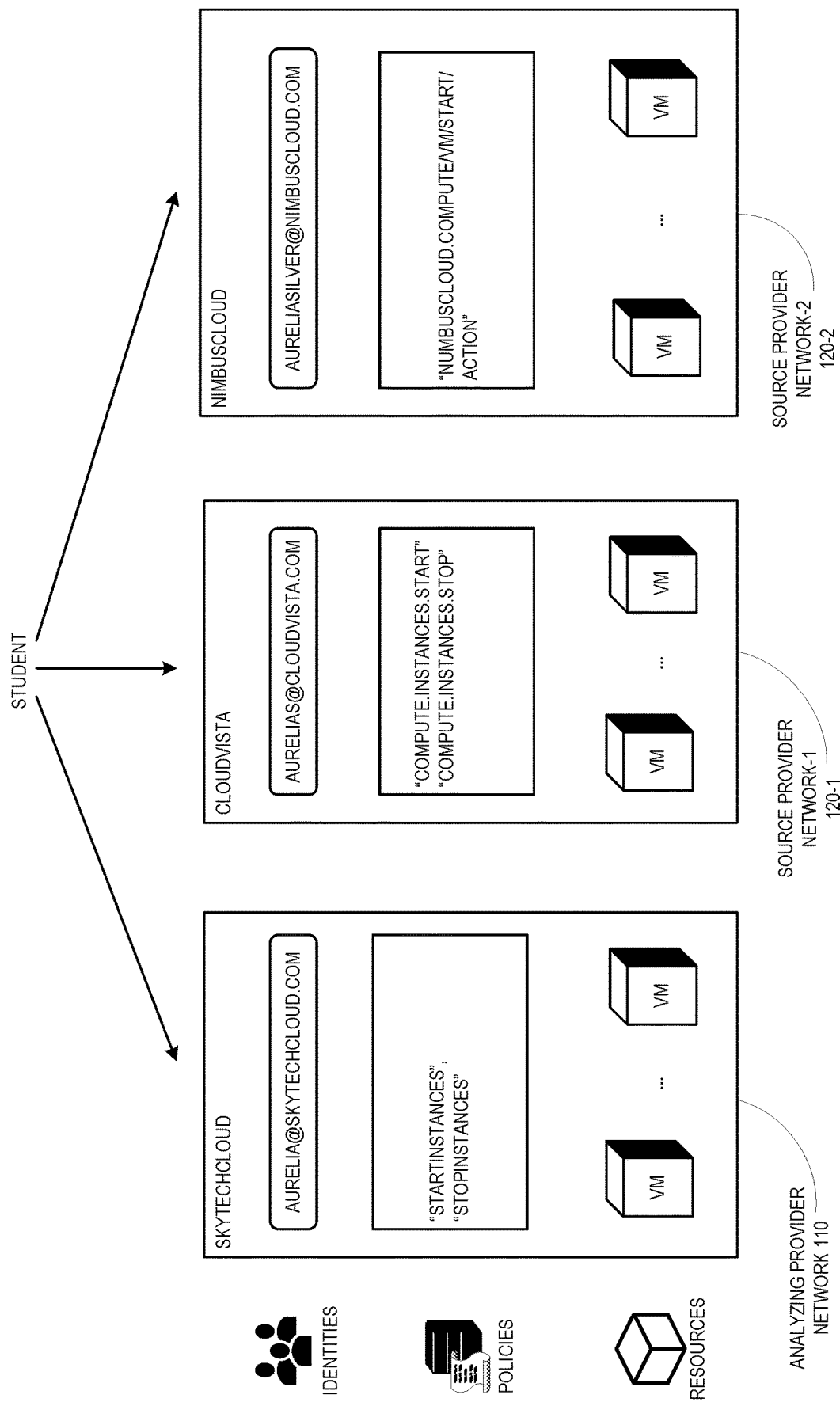
FIG. 3 illustrates another example of a problem solved by the disclosed techniques for access control policy analysis in a multi-provider network environment.

FIG. 3 illustrates another example of a problem solved by the disclosed techniques for access control policy analysis in a multi-provider network environment. Here, the customer has provisioned a set of virtual machine instances in each of provider networks 110, 120-1, and 120-2. For example, the customer may distribute virtual machines across provider networks 110, 120-1, and 120-2 for cost savings, for performance optimization, for risk mitigation, for regulatory compliance, or for other reasons. The customer has also configured an access control policy in each provider network 110, 120-1, and 120-2 that gives an identity in that provider network permission to start and stop the set of virtual machine instances in that provider network. The different identities in the provider networks 110, 120-1, and 120-2 may correspond to the same person such as, for example, a student that is interning with the customer and needs permission to start and stop virtual machine instances across the provider networks 110, 120-1, and 120-2 for a project they are working on for the customer. In this case, the customer may wish to verify that the student has permission to start and stop the various virtual machines across the provider networks 110, 120-1, and 120-2. If there is an error in the policy configuration in one of the provider networks 110, 120-1, and 120-2 such that the student was unable, for example, to stop virtual machine instances in that provider network, then the customer may incur unnecessary cost, time, and expense (e.g., where the provider network charges the customer for running virtual machine instances but not for stopped virtual machine instances). Accordingly, the customer may want to verify that the student has the equivalent permissions to start and stop virtual machine instances across the provider networks 110, 120-1, and 120-2.

To address the problem illustrated in FIG. 3 and other problems, access control policies from the various provider networks 110, 120-1, and 120-2 are compiled into a target representation that is provider network agnostic and automatically analyzable. This solution has the advantage that access control policy analysis can be conducted on the policies in the target representation. This means that to analyze a new source access control policy framework and language, only a compiler that can compile the new source access control policies into the target representation needs to be implemented, as opposed to having to implement a new analyzer for the new source access control policy framework and language.

Figure 4:
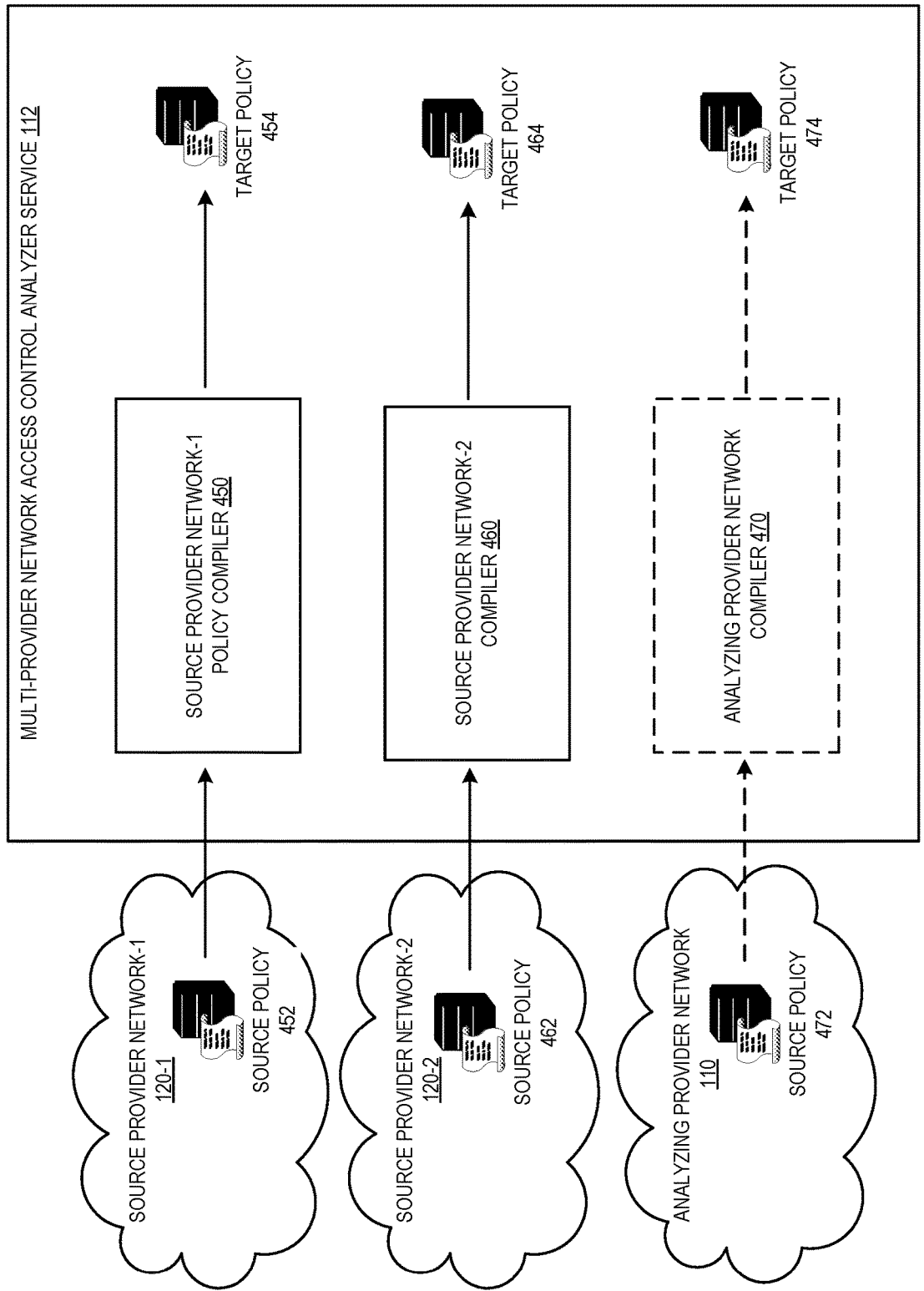
FIG. 4 illustrates compiling source policies from different provider networks into target policies in a target access control policy language.

FIG. 4 illustrates compiling source policies from different provider networks into target policies in a target access control policy language. Analyzer service 112 has a separate compiler 450, 460, and 470 for each different access control policy framework and language (each different provider network). In particular, compiler 450 compiles source policy 452 from source provider network-1 formatted according to the access control policy framework and language used for access control policies in the source provider network-1 120-1 into equivalent target access control policy 454 but formatted according to the target access control policy framework and language. Compiler 460 compiles source policy 462 from source provider network-2 formatted according to the access control policy framework and language used for access control policies in the source provider network-2 120-2 into equivalent target access control policy 464 but also formatted according to the target access control policy framework and language. Compiler 470 compiles source policy 472 from source provider network-2 formatted according to the access control policy framework and language used for access control policies in the analyzing provider network 110 into equivalent target access control policy 474 but also formatted according to the target access control policy framework and language. Analyzing provider network compiler 470 is indicated as optional in case access control policies of analyzing provider network 110 are already into the target access control policy framework and language.

A compiler 450, 460, and or 470 may compile a source access control policy in a source access control policy language to a corresponding target access control policy in the target access control policy language. The compiler may start this translation by converting the source policy into a stream of tokens by recognizing keywords, operators, identifiers, and other source access control policy-specific elements from the source access control policy. Using the tokens from the lexical analysis, the compiler generates a parse tree or abstract syntax tree. This tree represents the syntactic structure of the access control policy according to a language grammar of the source access control policy language.

The compiler may then conduct semantic analysis including creating a symbol table that holds information about identifiers such as user roles, groups, and resource and ensuring that the source access control policy adheres to the correct use of its language constructs, e.g., checking if the conditions specified have valid syntax and semantics.

The compiler may convert the parsed source access control policy into a target representation which is a generic, high-level representation of the source access control policy that abstracts aways from specific source access control policy language details yet retains the source access control policy's intent.

The compiler may perform optimization such as policy simplification by removing redundant rules, combining similar rules, or other optimizing the source access control policy for better efficiency without alternating its behavior. Another possible optimization is condition simplification where complex conditions and constraints of the source access control policy are simplified.

Using the target representation of the source access control policy and considering the semantics of the target policy language, the compiler generates the target access control policy in the target access control policy language. The compiler may then perform further optimizations to the target access control policy such as, for example, restructuring rules.

In some examples, differential testing is used by analyzer service 112 to determine whether the compiler correctly translated the input source access control policy into the target access control policy. Differential testing is a technique where the same inputs are fed to two systems, and their outputs are compared to identify discrepancies. In the context of validating a compiler that translated source access control policies to target access control policies, differential testing can be used by analyzer service 112 to ensure the behavior of the translated policy aligns with the source policy.

Figure 5:
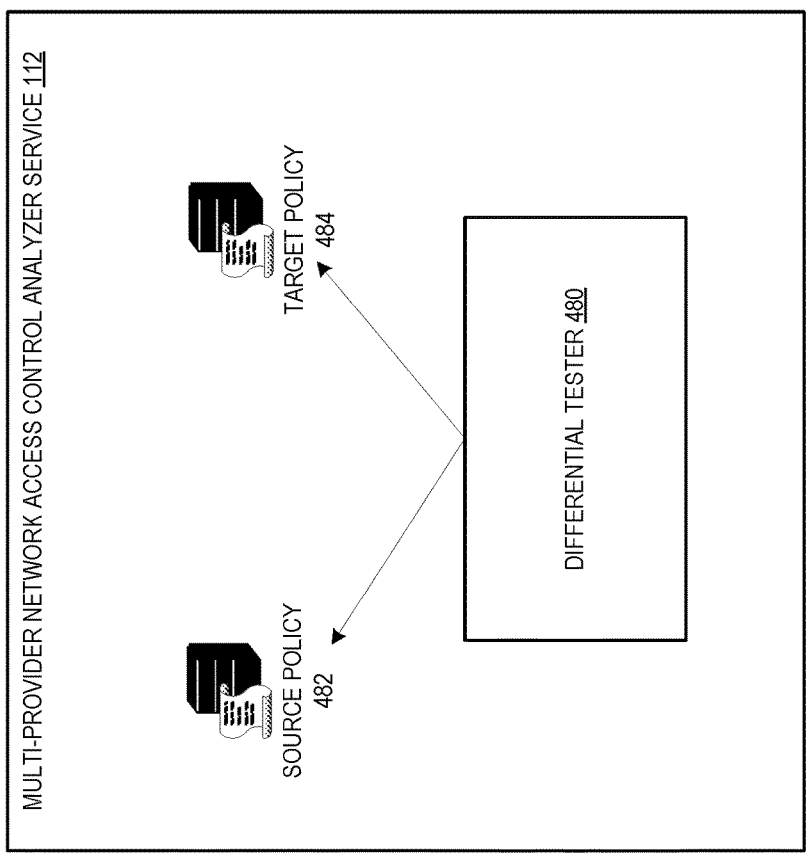
FIG. 5 illustrates an example of using differential testing to systematically validate that a compiler has translated a source access control policy into a target language without altering its behavior.

FIG. 5 illustrates an example of using differential testing to systematically validate that a compiler has translated a source access control policy into a target language without altering its behavior. To do differential testing, differential tester 480 uses a suite of access requests that covers a wide variety of potential scenarios. An access request may encompass a specification of a particular principal, action, resource, and conditions. The suite of access requests are used by differential tester 480 as the inputs that are fed to both the source access control policy 482 and the target access control policy 484. Differential tester 480 processes each access request of the suite against the source access control policy 482 and records whether the access requests source access control policy 482 permits or denies the access requests. Differential tester 480 uses the same suite of access requests to evaluate how the target access control policy 484 reacts.

Differential tester 480 records whether each access request results in an allow or deny decision. Differential tester 480 conducts a differential analysis where, for each access request in the suite, the decisions made by the source access policy 482 and the target access control policy 484 are compared. Both policies 482 and 498 should yield identical results (either allow or deny) for each access request in the suite of access requests for the translation of the source access control policy 482 to the target access control policy 484 to be considered accurate.

In some examples, if differences are found in the outcomes of the source 482 and target 484 policies, the differences are flagged for further investigation. For example, the discrepancies can be investigated to understand if they arise from the compiler's translation process or if they are due to inherent difference in the source and target policy languages. If issues in the compiler are identified, the necessary corrections can be made to the compiler such as refining the translation logic. After refining, the differential tester 480 can run the differential tests again to ensure the discrepancies are addressed. To ensure comprehensive validation, the suite of access requests can be expanded to test scenarios that might not have been covered by previous differential testing. For example, the suite of access requests can be expanded to include edge cases or complex conditions. As the source policy 482 evolves and the compiler is updated, differential testing can be run continuously to ensure that translations remain accurate.

Even if a translation from a source access control policy to a target access control policy is validated as accurate, the set of target access control policies (e.g., 454, 464, and 474) translated from a source of source access control policies (e.g., 452, 462, and 472) may not be in a condition for policy analysis. For example, the target access control policies in the target access control policy language may still identify principals, actions, resources, and conditions using identifiers that are specific to the respective source access control provider framework and language. For example, referring to the student example of FIG. 3, the translated target access control policies may still identify principals, actions, resources, and conditions using identifiers that are specific to the respective source access control provider framework and language. This makes the translated target access control policies incomparable for purposes of comparing access across different provider networks.

In some examples, a set of target access control policies in a common target access control policy language but that still respectively identify principals, actions, resources, or conditions in a provider network-specific way are quotiented. In particular, quotient identifiers can be introduced to define new identifiers as quotients of existing provider network-specific identifiers by an equivalence relation. This is useful to abstract the provider network-specific identifiers so that the target access control policies are comparable for purpose of comparing across different provider networks.

Quotienting may include defining equivalence relations for each type of identifier (principals, actions, resources, and conditions). Each equivalence relation may group together semantically equivalent or analogous identifiers across the different provider networks. For example, if "Admin" in one provider network is equivalent to "SuperUser" in another provider network, these two identifiers would in the same equivalence class under the relation for principals.

For each type of identifier, a quotient set may be constructed. Each quotient set contains elements where each element is an equivalence class. Each equivalence class represents a set of identifiers that are deemed equivalent across provider networks. Continuing the principals example, the equivalent class for "Admin" and "SuperUser" could be represented by a generic identifier like "PrivilegedUser."

For each target access control policy in a set of equivalent target access control policies, the original provider network-specific identifiers are replaced with the corresponding abstracted identifier from the quotient set. For example, an instance of the "Admin" principal in a target access control policy and an instance of the "SuperUser" principal in another target access control policy could be replaced by the identifier "PrivilegedUser."

The set of target access control policies are abstracted by quotienting to yield a set of quotient target access control policies where the specifics of the different provider networks have been quotiented out. This quotiented target access control policy set can be used for comparing the corresponding source access control policies across the different provider networks.

In some examples, a set of quotiented target access control policies are analyzed using automated reasoning. Automated reasoning, often relying on formal methods and tools, can systemically verify properties or answer questions about abstract models. Automated reasoning to help verify if a set of quotiented target access control policies maintain consistent access control behavior.

Automated reasoning can be applied in various ways. In one way, the quotiented target access control policies are expressed in a formal language suitable for automated reasoning. For example, a logic-based representation such as first-order-logic or propositional logic can be used for this purpose. The formalized policies may then be input to a model checker that automatically explores all possible states of a system to verify if certain properties hold. The model check confirms whether the property holds for all states or provides a counterexample where it does not hold. Additionally, or alternatively, an automated theorem prover such as a Satisfiability Modulo Theories (SMT) solver can be used to prove the correctness of more complex properties. By defining the desired behaviors as theorems, a theorem prover can help validity the policy's behavior. If a theorem can be provided, it means that the behavior holds under all possible conditions.

In some examples, multiple quotiented target access control policies are compared to determine if they allow the same access. Each policy is encoded for analysis by an automated reasoning tool (e.g., a SMT solver). The automated reasoning tool is used to verify a property against each policy. Note that since the target access control policies have been quotiented, the same property can be verified against each quotiented policy.

Figure 6:
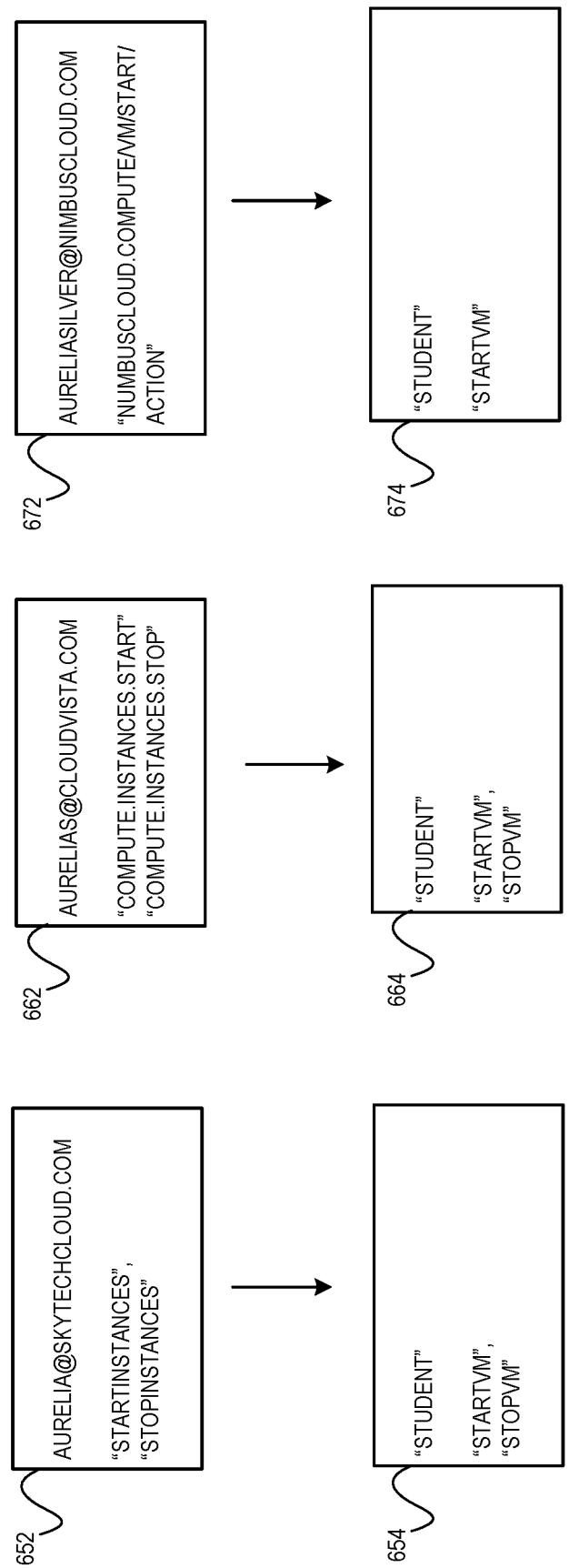
FIG. 6 show source access controls policies and corresponding quotiented target access control policies.

FIG. 6 show source access controls policies 652, 662, and 672 and corresponding quotiented target access control policies 654, 664, and 674. The source access control policies 652, 662, and 672 express permissions using different respective action identifiers. However, in the quotiented target access control policies 654, 664, and 674, the different respective action identifiers have been quotiented, thereby making the target access control policies 654, 664, and 674 comparable for the purpose of analyzing source access control policies 654, 664, and 674.

In addition, in the quotiented target access control policies 654, 664, and 674, the different respective principal identifiers corresponding to the same person have been quotiented, thereby making the target access control policies 654, 664, and 674 comparable for the purpose of analyzing source access controls 654, 664, and 674. In particular, the quotiented target access control policies 654, 664, and 674 can be analyzed using an automated reasoning tool using the same quotiented property. In other words, the same quotiented property can be verified against each quotiented target access control policy 654, 664, and 674. For example, in the student example of FIG. 3, the quotiented property against which each quotiented target access control policies 654, 664, and 674 could be: Does STUDENT have permission to STARTVM and STOPVM the customer's virtual machine instances in the corresponding provider network?

Figure 7:
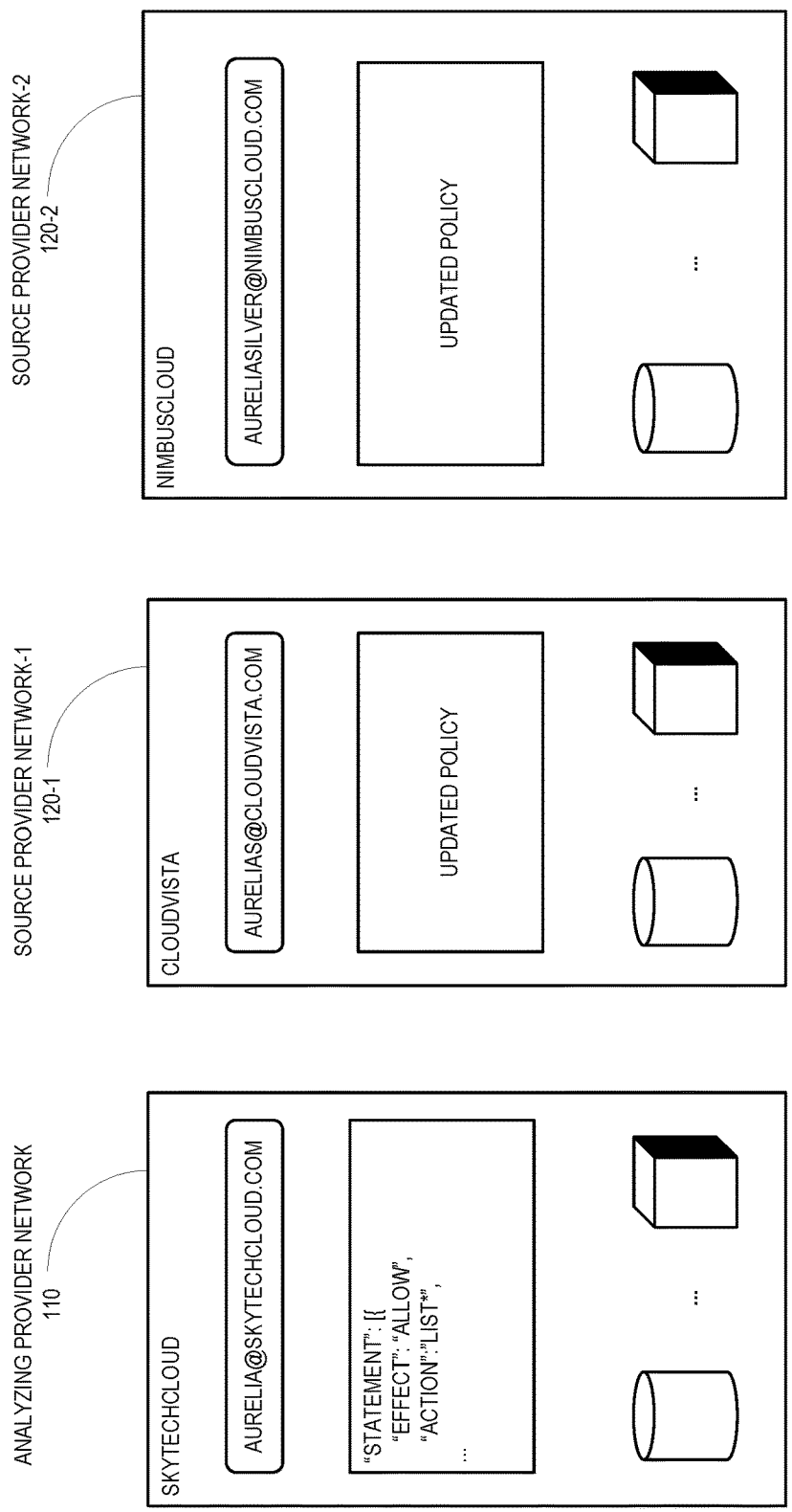
FIG. 7 provides an example of an access control policy authored in a target access control policy language.
Figure 7:
Figure 7:
Figure 7:

FIG. 7 illustrates another issue that can arise in multi-cloud provider network environments. In this scenario, modifications have been made to policies in some provider networks but not others. In this example, policies at source provider network-1 120-1 and source provider network-2 120-2 have been updated. One question to ask is what permissions, if any, were gained or lost by the policy updates. A second question to ask is, if permissions were gained or lost by the updates, do those changes need to be propagated to the unmodified polices at the other provider networks (e.g., the policy at analyzing provider network 110). As discussed above with respect to FIG. 3, addressing this issue is a challenge because each different provider network may have policies with incomparable principals, actions, and resources.

Figure 8:
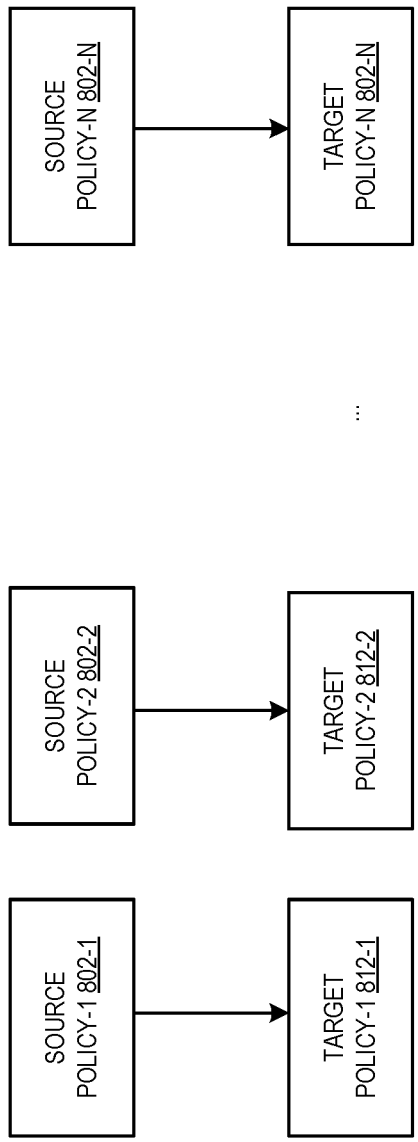
FIG. 8 illustrates translation of source policies to target policies.

To address the problem illustrated by the example of FIG. 3 and the problem illustrated by the example of FIG. 7, policies from different provider networks are compiled (translated) into a target access management representation that is provider network-agnostic and automatically analyzable. FIG. 8 illustrates the translation of source access control policies 802-1, 802-2, . . . 802-N from different provider networks into respective target access control policies 812-1, 812-2, . . . 812-N in the target access management representation. Each source policy 802-1, 802-2, . . . 802-N is compiled (translated) into a respective target policy 812-1, 812-2, . . . 812-N in the target access management representation.

The target access management representation is a "target" policy language that is simple, yet expressive and fast and scalable. The target policy language is also designed for analysis using automated reasoning such as SMT solver tools. The target policy language is suitable for common authorization models such as role-based access control models. The target policy language supports fast and scalable real-time evaluation and is automatically analyzable.

Policies in the target policy language may be composed of principals, actions, and resources. For example, a policy in the target policy language may express that a principal "identity1" can perform action "action1" on resource "project." In addition, the target policy language allows for the management of multiple principals, multiple actions, and multiple resources. For example, a policy in the target policy language may express that all principals in group "G1" can perform all actions in "actionGroup" on all resources in resource "project."

In some examples, the target policy language supports the notions of entities and schema. For example, consider principal group "G1" containing three principals for three provider networks: "tom@skytechcloud.com," "chopinli@skytechcloud.com," and "jerry@ nimbuscloud.com." An entity may be defined for each principal. The entity may have attributes and hierarchical relationships with other entities. For example, the entity representing the principal "chopinli@skytechcloud.com" may be defined in the target policy language as follows:

01:
02:
03:
04:
05:

```
{
   "uid" : "User::\"chopinli@ skytechcloud.com\"",
   "attrs" : { ... },
   "parents" : ["UserGroup::\"G1\""]
}
```

In the above example, the "uid" value is composed of the entity type "User" and the unique id-"chopinli@ skytechcloud.com." This principal has some attributes. Then, because this principal belongs to group "G1", the "UserGroup" identified as "G1" is a parent entity of this entity.

As another example, consider a virtual machine instance "VM" contained in a resource "project." For the entity of the virtual machine instance, the "uid" may be composed of the type of resource (e.g., "VirtualMachine") and the unique id "VM." It may also have some attributes. Since the instance "VM" belongs to resource "project," the resource "project" may be the parent of the instance "VM." For example, the entity representing the instance "VM" may be defined in the target policy language as follows:

01:
02:
03:
04:
05:

```
{
    "uid" : "VirtualMachine::\"VM\"",
    "attrs" : { ... },
    "parents" : ["Project::\"project\""]
}
```

A schema of the target policy language defines the rules for defining entities. For example, in this example schema, the principal type is "User". A "User" instance can have one or more attributes where the type of attributes should be "Record." And the parents of a "User" instance should be of type "UserGroup."

01:
02:
03:
04:
05:
06:
07:

```
"User" : {
    "shape" : {
        "type" : "Record",
        "attributes" : {...},
    },
    "memberOfTypes" : ["UserGroup"]
}
```

As another example, this schema defined the rule for the "VirtualMachine" entity type. For this type, an entity definition should have attributes of type "Record" and the parent entity type should be type "Project."

01:
02:
03:
04:
05:
06:
07:

```
"VirtualMachine" : {
    "shape" : {
        "type" : "Record",
        "attributes" : {...},
    },
    "memberOfTypes" : ["Project"]
}
```

As another example, this following schema defines an action "action1" type and an instance of which can only be performed on resources of type "Storage" and can only be performed by principals of type "User." The schema also defines that an "action1" action can be a member of "actionGroup."

01:
02:
03:
04:
05:
06:
07:
08:
09:
10:

```
"action1" : {
    "appliesTo" : {
        "resourceTypes" : [" Storage" ],
        "principalTypes" : [ "User" ]
    },
    "memberOf" : [ {
        "id" : "actionGroup",
        "type" : "Action"
    }]
}
```

As yet another example, this following schema defines an action "action2" type and an instance of which can only be performed on resources of type "VirtualMachine" and can only be performed by principals of type "User." The schema also defines that an "action1" action can be a member of "actionGroup."

01:
02:
03:
04:
05:
06:
07:
08:
09:

```
"action2" : {
    "appliesTo" : {
        "resourceTypes" : [" VirtualMachine" ],
        "principalTypes" : [ "User" ]
    },
    "memberOf" : [ {
        "id" : "actionGroup",
        "type" : "Action"
    }]
}
```

Figure 9:
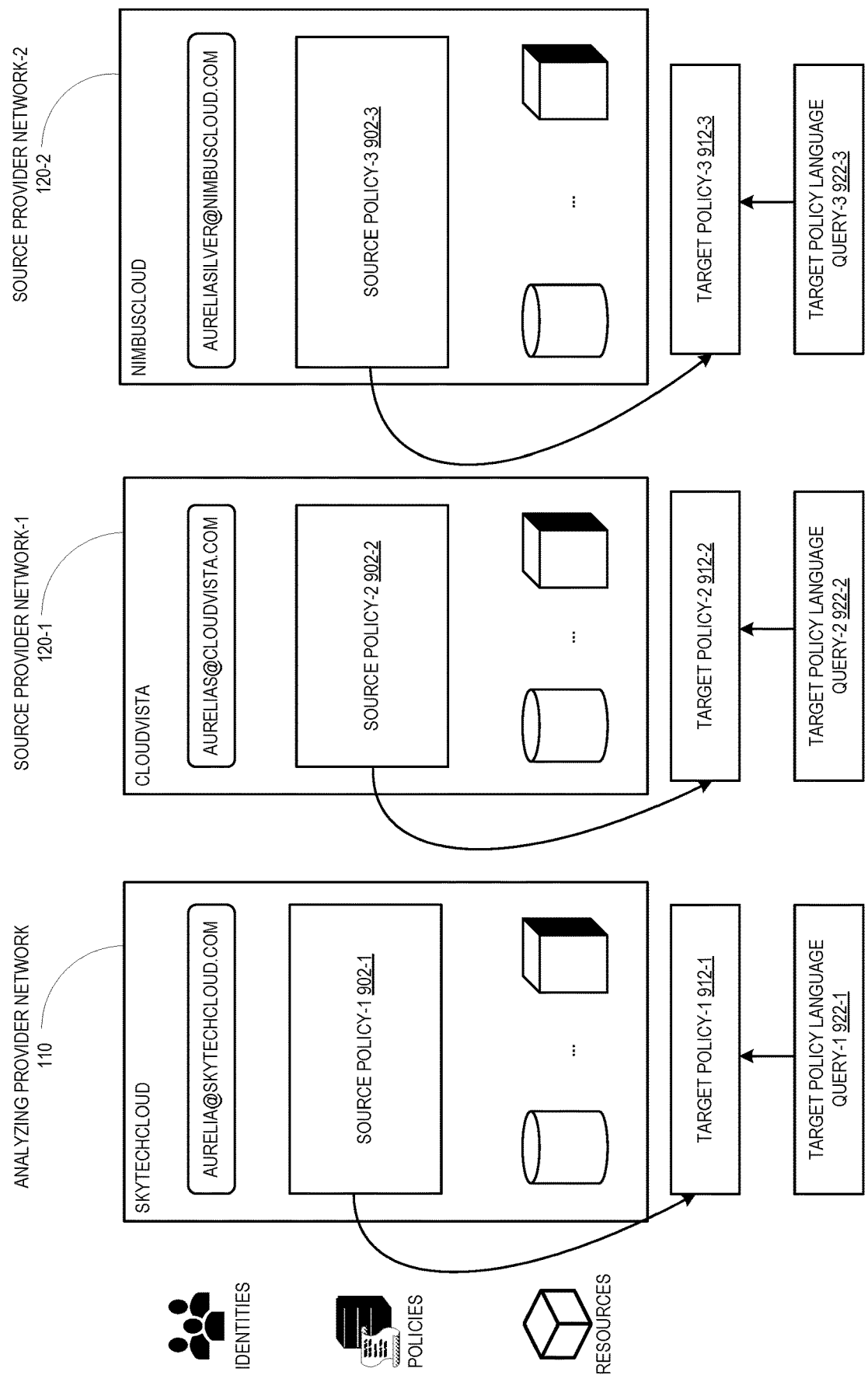
FIG. 9 illustrates translation of source policies from different provider networks into target policies in a target access control policy language.

FIG. 9 illustrates translating source policies from different provider networks into policies in the target policy language which allows for automated reasons around who can access what. For example, source policy-1 902-1 from analyzing provider network 110 is translated to target policy-1 912-1 in the target policy language, source policy-2 902-2 from source provider network 120-1 is translated to target policy-2 912-2 in the target policy language, and source policy-3 903-3 from source provider network 120-2 is translated to target policy-3 912-3 in the target policy language. All target policies 912-1, 912-2, 912-3 are in the target policy language. In addition to translating source policies to target policies, source requests (e.g., principal, action, resource tuples) can be translated to target requests in the target policy language. The target requests (e.g., 922-1, 922-2, and 922-3) can then be evaluated against the target polices 912-1, 912-2, and 912-3, respectively, to determine who can access what.

Figure 10:
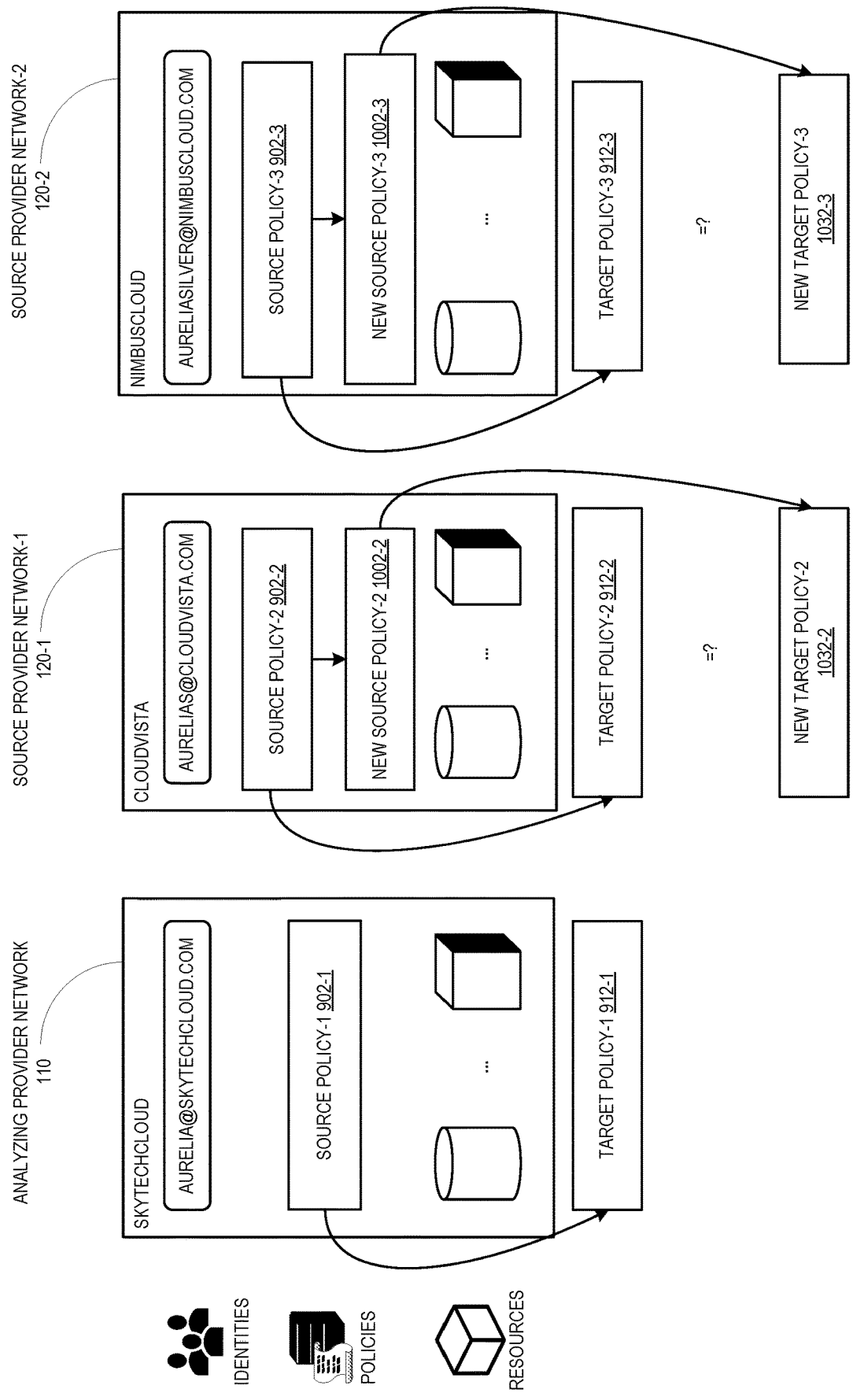
FIG. 10 illustrates equivalence checking modified source policies from a source provider network using translations of the source policies to target policies in a target access control policy language.

FIG. 10 illustrates reasoning about permission changes in a multi-cloud environment. As depicted in FIG. 9, source policy-1 902-1 from analyzing provider network 110 is translated to target policy-1 912-1 in the target policy language, source policy-2 902-2 from source provider network 120-1 is translated to target policy-2 912-2 in the target policy language, and source policy-3 903-3 from source provider network 120-2 is translated to target policy-3 912-3 in the target policy language. Source policy-2 902-2 is modified to yield a new version of the policy depicted as new source policy-2 1002-2. Source policy-3 is also modified to yield a new version of that policy depicted as new source policy-3 1002-3. New source policy-2 1002-2 from source provider network-1 120-1 is translated to new target policy-2 1032-2 in the target policy language. New source policy-3 1002-3 from source provider network-2 120-2 is translated to new target policy 1032-3 in the target policy language. Analyzer service 112 can check the equivalence using automated reasoning tools (e.g., SMT solver tools) of target policy-2 1012-2 and new target policy-2 1032-2 to understand (reason about) the modification to source policy-2 902-2 that resulted in new source policy-2 1002-2. Likewise, analyzer service 112 can check the equivalence using automated reasoning tools (e.g., SMT solver tools) of target policy-3 1012-3 and new target policy-3 1032-2 to understand (reason about) the modification to source policy-3 902-3 that resulted in new source policy-3 1002-3. For example, analyzer service 112 can use differential testing or an SMT solver to determine if target policy-3 903-2 is less permissive, more permissive, or equivalent than new target policy-3 1032-3 and report the determination to user (e.g., via a GUI, CLI, or API).

The translation of a source policy to a target policy will now be described by an example. Consider the source policy that assigns the role "Computer Viewer" to a list of members on a resource "project." The list of members contains the identity "identity1." The "Computer Viewer" role contains an action "compute.instances.get" that can only be performed on virtual machine instances with the resource "project." This source policy can be translated to a target policy in the target policy language by defining entities in the target access control policy language for the identities (e.g., "identity1"), the resources within the resource "project" (e.g., a virtual machine instance "VM" in resource "project"), and the resource "project" itself. The source policy can be translated to target policy by defining a schema in the target policy language for the entities. In this case, the schema may define a "User" type for the identifies (e.g., "identity1"), a "Virtual Machine" type for the virtual machine instances within the resource "project," and a "Computer Viewer" type for the "Computer Viewer" role. The "Computer Viewer" type may be defined such that it may contain a set of actions. The schema can also define an action "compute.instance.get" that can be contained by the "Computer Viewer" role and that can only be performed on instances of the "Virtual Machine" type and can only be performed by identities of the "User" type.

As mentioned, to verify the correction of a translation of a source policy to a target policy, differential testing may be used. In particular, given a principal, action, and resource tuple, an access request in source policy language can be evaluated against the source policy and an access request in the target policy language can be evaluated against the target policy. If both system output ALLOW or both system output DENY for the access requests, then the source policy and the target policy are equivalent at least with respect to those access requests. If they differ, then they are not equivalent and there may have been an error in the translation process. This test may be repeated for other principal, action, and resource tuples to more comprehensively test for equivalence and verify translation.

Example Provider Network Environment

Figure 11:
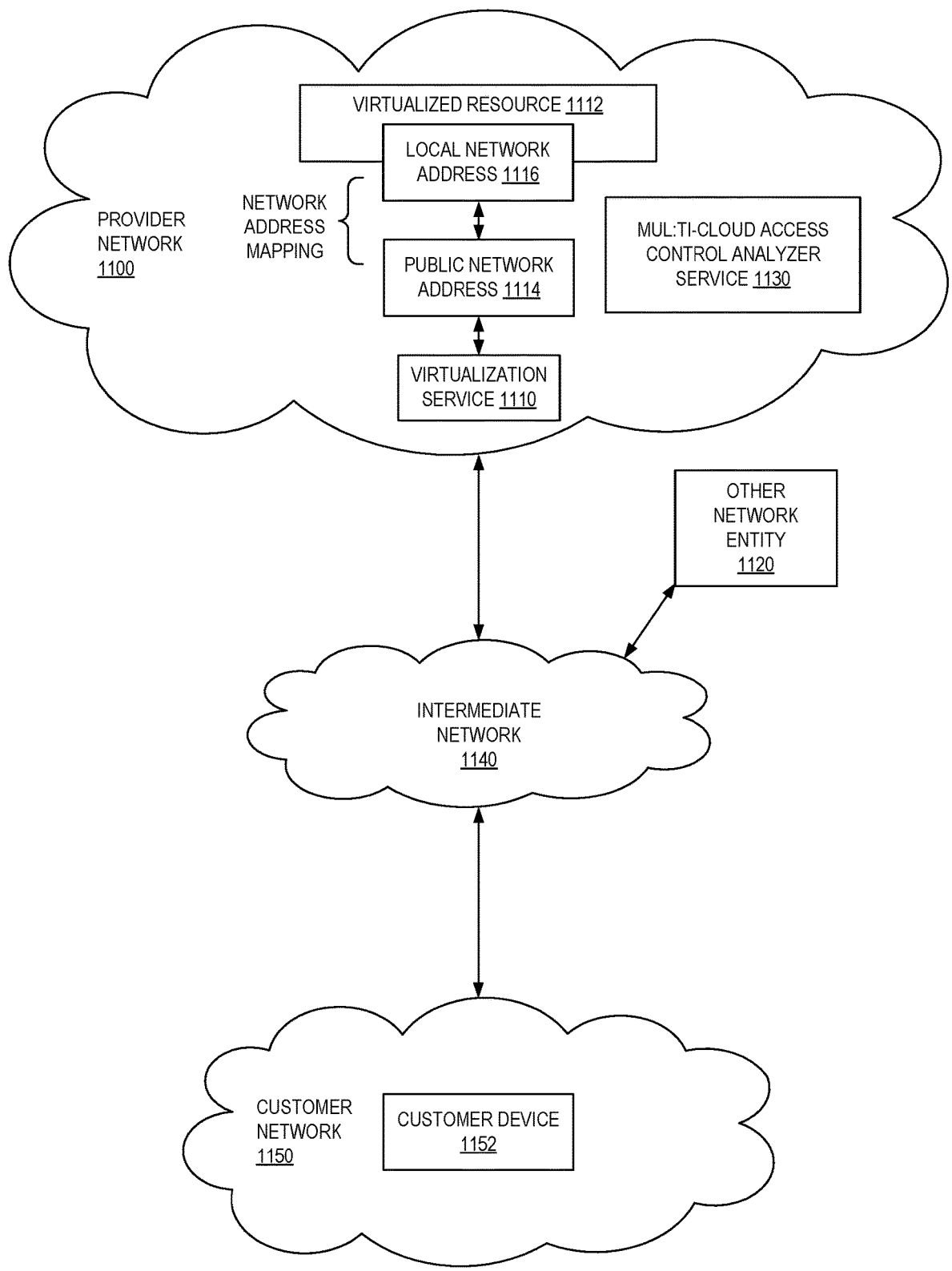
FIG. 11 illustrates an example of a provider network environment in which techniques for access control policy analysis in a multi-provider network environment are used.

FIG. 11 illustrates an example of a provider network environment in which the techniques for access control policy analysis in a multi-provider network environment are used. Provider network 1100 encompasses the infrastructure and architecture established by a cloud service provider to deliver cloud services and virtualized resources to customers. Provider network 1100 may be distributed over multiple data centers in different geographic regions. Each data center houses the physical hardware and servers that host the virtualized resources, applications, and services provided by the cloud service provider. The purpose of provider network 1100 is to enable customers to access and utilize cloud-based services, applications, and virtualized resources over the internet from their customer networks (e.g., customer network 1150) and using their computing devices (e.g., customer device 1152) securely and efficiently. While only one customer network and one customer device are depicted in FIG. 11 for the purpose of providing a clear example, provider network 1100 may be accessed by many customer networks and many customer devices.

In addition to providing a multi-cloud access control analyzer service 1130, provider network 1100 provides virtualization service 1110 that allows customers to use virtualized resources (e.g., virtualized resource 1112) in provider network 1100. While only a single virtualized resource is depicted in FIG. 11 for the sake of providing a clear example, provider network 1100 may encompass many virtualized resources. Thus, virtualized resource 1112 generically represents one of potentially many virtualized resources in provider network 1100. Virtualized resource 1112 can be one of various different types of virtualized resources that may exist in provider network 1100 including, for example, a virtual machine, a container, a virtual router, a virtual switch, a virtual load balancer, a virtual firewall, a virtual network interface, a virtual network service, or any other suitable type of virtualized resource.

Figure 12:
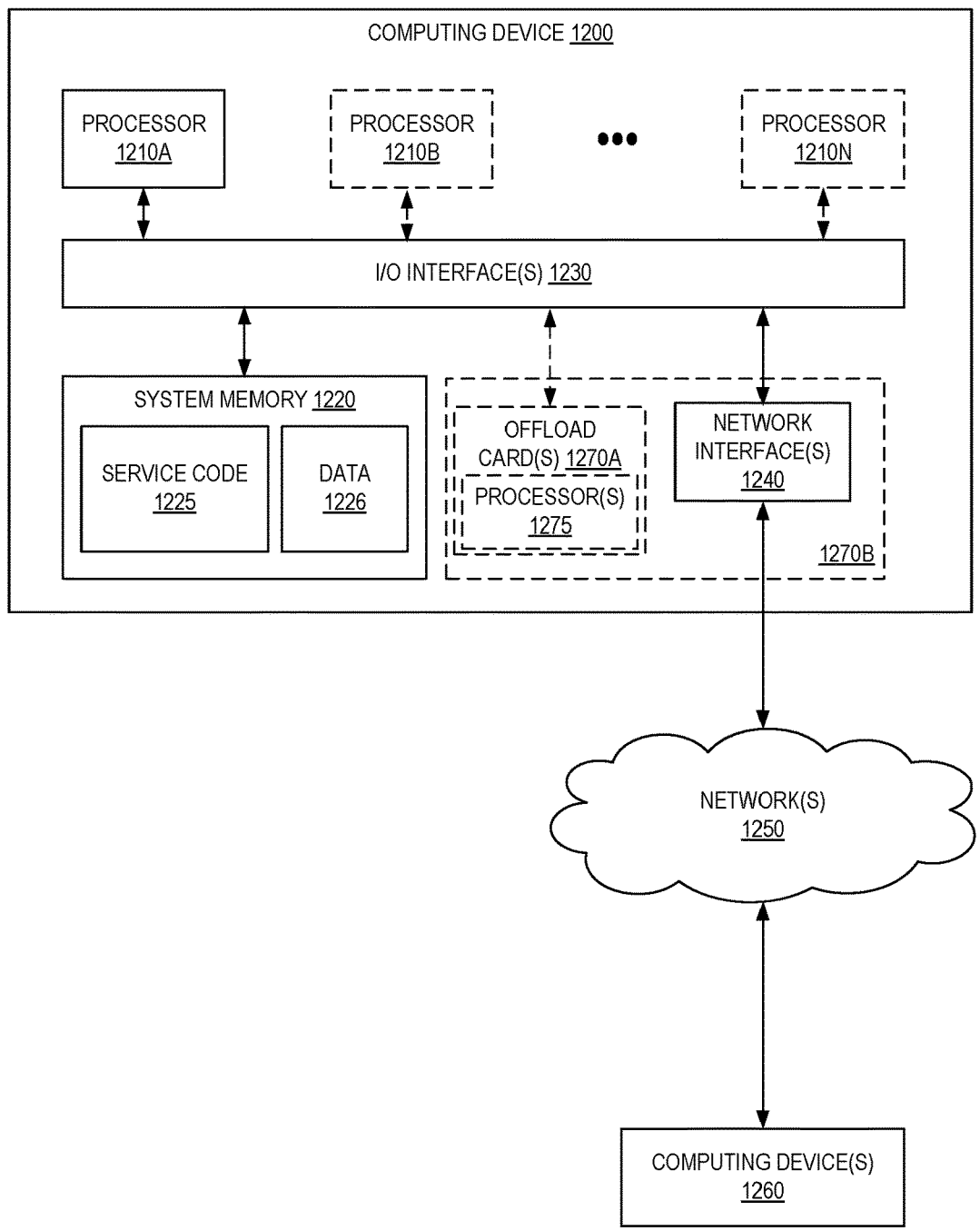
FIG. 12 illustrates an example of a computing device used to implement techniques for access control policy analysis in a multi-provider network environment.

Virtualization service 1110 allows multiple virtualized resources (e.g., virtualized resource 1112), such as operating systems, servers, storage, or networks, to run on a single physical hardware platform (e.g., computing device 1200 of FIG. 12). Virtualization service 1110 may use various technologies to accomplish virtualization including any or all of: a hypervisor or a virtual machine monitor or other software or firmware that creates and manages virtual machines, a virtual machine or other emulation of a physical computer that is capable of running its own operating system and applications independently from a host system and other virtual machines on the same hardware, a host system or a physical server or computer that runs the hypervisor/virtual machine monitor and host virtual machines, guest operating systems installed on each virtual machine that behave as if they were running on a dedicated physical machine, or other suitable virtualization technology.

By implementing virtualization via virtualization service 1110, provider network 1100 provides several benefits to customers and the cloud service provider. Virtualization allows better utilization of underlying hardware resources by running multiple virtual machines on a single physical server resulting in cost savings and more efficient use of computing power. Each virtual machine is isolated from others to a degree, providing security and fault tolerance such that if a virtual machine crashes or experiences an issue, it does not affect other virtual machines on the same host system. Virtualization allows easy creation, deletion, and migration of virtual machines, enabling greater flexibility and scalability in managing the provider network environment. Virtualization enables rapid software testing and development, as it allows developers to create multiple environments quickly and without the need for separate physical hardware.

Additionally or alternatively, virtualization provided by virtualization service 1110 encompasses containerization technologies. Containerization is a form of virtualization that allows software applications and their dependencies to be packaged and isolated into self-container units called containers. Each container includes the application, runtime, libraries, and other necessary components, ensuring that the application runs consistently and reliably across different environments. Containerization provides a lightweight, portable, and scalable solution for deploying and managing software applications. Containers share the host system's operating system kernel, which makes them more efficient than virtual machines that require separate guest operating systems. This allows containers to start and stop quickly, using fewer resources, and scale easily.

Provider network 1100 uses public network addresses (e.g., public network address 1114) and local IP addresses (e.g., local network address 1114) to provide virtualized resources to customers. Provider network 1100, via virtualization services 1110, allows public network address 1114 and local network address 1116 to be associated with virtualized resource 1112 provisioned to a customer. Public network address 1114 may be one of many public network addresses used by provider network 1100. Likewise for local network address 1116. Thus, public network address 1114 and local network address 1116 generically represent a public network address and local network address respectively used by provider network 1100 to provide a virtualized resource. Both public network address 1114 and local network address 1114 may be an internet protocol (IP) network address such as, for example, an IPv4 or IPv6 network address. Local network address 1116 can be a private network address within an address block reserved by Internet Engineering Task Force (IETF) Request for Comments (RFC) 1918 or of an address format specified by IETF RFC 4193 or other type of private network address.

Using resource 1112 and public network address 1114, a customer can implement a customer-specific application and present the application on intermediate network 1140 (e.g., the internet). Network traffic originating outside provider network 1100 is not directly routed to local network address 1116. Instead, the network traffic uses public network address 1114 that is mapped to local IP address 1116. Provider network 1100 can include a networking device or appliance that provides network address translation (NAT) or similar functionality to perform forward mapping from public IP address 1114 to local IP address 1116. Another network entity 1120 on intermediate network 1140 can generate network traffic (e.g., internet protocol (IP) packets) to public network address 1114. The network traffic destined for public network address 1114 is routed via intermediate network 1140 to provider network 1100. The received network traffic is routed within provider network 1100 to local network address 1116 and to virtualized resource 1112 that processes the network traffic. Network traffic generated by virtualized resource 1112 may be routed onto intermediate network 1140 to network entity 1120.

Example Computing Device

FIG. 12 illustrates an example of a computing device used to implement techniques for access control policy analysis in a multi-provider network environment. In some examples, a system that implements a portion or all of the techniques described herein can include a general-purpose computer system, such as the computing device 1200 (also referred to as a computing system or electronic device) illustrated in FIG. 12, that includes, or is configured to access, one or more computer-accessible media. In the illustrated example, the computing device 1200 includes one or more processors 1210 coupled to a system memory 1220 via an input/output (I/O) interface 1230. The computing device 1200 further includes a network interface 1240 coupled to the I/O interface 1230. While FIG. 12 shows the computing device 1200 as a single computing device, in various examples the computing device 1200 can include one computing device or any number of computing devices configured to work together as a single computing device 1200.

In various examples, the computing device 1200 can be a uniprocessor system including one processor 1210, or a multiprocessor system including several processors 1210 (e.g., two, four, eight, or another suitable number). The processor(s) 1210 can be any suitable processor(s) capable of executing instructions. For example, in various examples, the processor(s) 1210 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1210 can commonly, but not necessarily, implement the same ISA.

The system memory 1220 can store instructions and data accessible by the processor(s) 1210. In various examples, the system memory 1220 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1220 as service code 1225 (e.g., executable to implement, in whole or in part, multi-cloud access control analyzer service 112 of FIG. 1) and data 1226.

In some examples, the I/O interface 1230 can be configured to coordinate I/O traffic between the processor 1210, the system memory 1220, and any peripheral devices in the device, including the network interface 1240 and/or other peripheral interfaces (not shown). In some examples, the I/O interface 1230 can perform any necessary protocol, timing, or other data transformations to convert data signals from one component (e.g., the system memory 1220) into a format suitable for use by another component (e.g., the processor 1210). In some examples, the I/O interface 1230 can include support for devices attached through various types of peripheral buses, such as a variant of the Peripheral Component Interconnect (PCI) bus standard or the Universal Serial Bus (USB) standard, for example. In some examples, the function of the I/O interface 1230 can be split into two or more separate components, such as a north bridge and a south bridge, for example. Also, in some examples, some or all of the functionality of the I/O interface 1230, such as an interface to the system memory 1220, can be incorporated directly into the processor 1210.

The network interface 1240 can be configured to allow data to be exchanged between the computing device 1200 and other computing devices 1260 attached to a network or networks 1250, such as other computer systems or devices as illustrated in FIG. 1, for example. In various examples, the network interface 1240 can support communication via any suitable wired or wireless general data networks, such as types of Ethernet network, for example. Additionally, the network interface 1240 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1200 includes one or more offload cards 1270A or 1270B (including one or more processors 1275, and possibly including the one or more network interfaces 1240) that are connected using the I/O interface 1230 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1200 can act as a host electronic device (e.g., operating as part of a hardware virtualization service) that hosts compute resources such as compute instances, and the one or more offload cards 1270A or 1270B execute a virtualization manager that can manage compute instances that execute on the host electronic device. As an example, in some examples the offload card(s) 1270A or 1270B can perform compute instance management operations, such as pausing and/or un-pausing compute instances, launching and/or terminating compute instances, performing memory transfer/copying operations, etc. These management operations can, in some examples, be performed by the offload card(s) 1270A or 1270B in coordination with a hypervisor (e.g., upon a request from a hypervisor) that is executed by the other processors 1210A-910N of the computing device 1200. However, in some examples the virtualization manager implemented by the offload card(s) 1270A or 1270B can accommodate requests from other entities (e.g., from compute instances themselves), and cannot coordinate with (or service) any separate hypervisor.

In some examples, the system memory 1220 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1200 via the I/O interface 1230. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1200 as the system memory 1220 or another type of memory. Further, a computer-accessible medium can include transmission media or signals such as electrical, electromagnetic, or digital signals, conveyed via a communication medium such as a network and/or a wireless link, such as can be implemented via the network interface 1240.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle (R), Microsoft (R), Sybase (R), IBM (R), etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

Terminology

In the previous description, numerous examples have been detailed. To facilitate comprehension, particular configurations and specifics have been presented to offer a comprehensive grasp of the examples. Nevertheless, it will be evident to a skilled practitioner in the field that these examples can be implemented even in the absence of these precise details. Additionally, commonly recognized features may be excluded or streamlined to avoid obscuring the essence of the described example.

Bracketed text and sections outlined by dashed borders (e.g., using large dashes, small dashes, dot-dash, and dots) are employed here to depict optional elements that contribute supplementary features to specific examples. Nonetheless, this notation shouldn't be construed as an indication that these are the sole choices or optional processes available, or that sections outlined by solid borders are non-optional in particular instances.

Reference numerals supplemented with suffix identifiers serve to denote that there could be one or multiple occurrences of the cited entity in different examples. In cases where multiple instances arise, it's important to note that these instances need not be identical but may instead share certain general attributes or exhibit common behavior. Additionally, the specific suffixes employed are not indicative of a particular quantity of entities unless explicitly stated otherwise. Consequently, when two entities are denoted with the same or distinct suffix letters, the presence of the same number of instances in various examples may or may not hold true.

Instances where phrases like "one example," "an example," "in some examples," "in certain instances," and the like are used, signify that the delineated example might encompass a specific feature, structure, or attribute. However, it should be noted that not every example is obliged to incorporate this specific aspect. Additionally, these phrases don't necessarily pertain to identical examples. Furthermore, when a particular feature, structure, or characteristic is elucidated in conjunction with an example, it's understood that those skilled in the field can apply such an element in relation to other examples, regardless of whether it's expressly mentioned.

Furthermore, across the assorted examples outlined above, unless explicitly indicated otherwise, language that presents options, such as the expression "at least one of A, B, or C," is intended to encompass A, B, or C independently, or any potential combination thereof (e.g., A, B, and/or C). In a similar vein, language like "at least one or more of A, B, and C" (or "one or more of A, B, and C") is intended to signify A, B, or C separately, or any conceivable combination thereof (e.g., A, B, and/or C). Hence, the intention behind disjunctive language is neither to imply nor should it be construed as implying that a given example necessitates the presence of at least one of A, at least one of B, and at least one of C, all simultaneously.

In the context of this document, the term "based on" (or similar phrases) is an expansive term employed to characterize one or more elements that influence a determination or other form of action. It's crucial to recognize that this term does not preclude the involvement of additional factors that might also impact a decision or action. For instance, a determination might be solely influenced by the listed factor(s), or it could be guided by the factor(s) in conjunction with one or multiple supplementary factors. Therefore, when an action, denoted as A, is stated to be "based on" B, it indicates that B is a contributing factor to the influence on action A. However, this doesn't discount the possibility that the action may also draw influence from one or more other factors, such as factor C. Nevertheless, in certain scenarios, action A might indeed be exclusively influenced by B.

Unless expressly specified otherwise, articles such as "a" or "an" should typically be understood to encompass one or multiple of the described entities. Consequently, expressions like "a device configured to" or "a computing device" are intended to encompass one or multiple of the devices mentioned. These one or more devices that are mentioned can collectively be arranged to execute the actions detailed. For instance, the phrase "a processor configured to perform operations A, B, and C" can encompass a first processor configured for operation A in tandem with a second processor configured to perform operations B and C.

Additionally, the terms "may" or "can" are employed in a permissive context, signifying potential capability, rather than being mandatory in nature. The terms "include," "including," and "includes" are utilized to signify broad-ranging relationships, thereby encompassing, but not limited to, the items mentioned. Similarly, the terms "have," "having," and "has" also denote open-ended relationships, suggesting possession, but not being limited to it.

The designations "first," "second," "third," and so forth, as employed in this context, serve as labels for the nouns they precede. These labels do not infer any particular order (e.g., spatial, temporal, logical, etc.), unless explicitly indicated otherwise. Similarly, the numerical values of such labels generally do not signify a stipulated quantity of a specific noun within the claims articulated herein. Therefore, a "fifth" element usually does not imply the presence of four other elements, unless these elements are explicitly referenced in the claim or it is expressly made evident that they exist.

Therefore, the specification and drawings are intended to be perceived in an illustrative capacity rather than a confining one. It will be apparent, though, that numerous modifications and adjustments can be introduced without straying from the broader ambit of the disclosure as delineated in the claims.

What is claimed is:

1. A method comprising:
    compiling, by a first provider network, a first source access control policy into a first target access control policy;
    compiling, by the first provider network, a second source access control policy into a second target access control policy;
    compiling, by the first provider network, a third source access control policy into a third target access control policy;
    quotienting, by the first provider network, the first target access control policy to yield a first quotiented target access control policy, wherein the quotienting defines equivalence relations for types of identifiers including at least one of principals, actions, resources, or conditions, such that the equivalence relations group together semantically equivalent ones of the identifiers across different provider networks;
    quotienting, by the first provider network, the second target access control policy to yield a second quotiented target access control policy;
    quotienting, by the first provider network, the third target access control policy to yield a third quotiented target access control policy;
    using, by the first provider network, an automated reasoning tool to verify a quotiented property against the first quotiented target access control policy;
    using, by the first provider network, an automated reasoning tool to verify the quotiented property against the second quotiented target access control policy; and
    using, by the first provider network, an automated reasoning tool to verify the quotiented property against the third quotiented target access control policy.

2. The method of claim 1, further comprising:
    obtaining the first source access control policy from a second provider network; and
    obtaining the second source access control policy from a third provider network.

3. The method of claim 1, wherein:
    the first source access control policy is expressed in a first access control policy language;
    the second source access control policy is expressed in a second access control policy language; and
    the third source access control policy is expressed in a third access control policy language.

4. A method comprising:
    compiling a first source access control policy into a first target access control policy;
    compiling a second source access control policy into a second target access control policy;
    quotienting the first target access control policy to yield a first quotiented target access control policy, wherein the quotienting defines equivalence relations for types of identifiers including at least one of principals, actions, resources, or conditions, such that the equivalence relations group together semantically equivalent ones of the identifiers across different provider networks;
    quotienting the second target access control policy to yield a second quotiented target access control policy;
    using an automated reasoning tool to verify a quotiented property against the first quotiented target access control policy; and
    using an automated reasoning tool to verify the quotiented property against the second quotiented target access control policy.

5. The method of claim 4, further comprising:
    obtaining the first source access control policy from a first provider network; and
    obtaining the second source access control policy from a second provider network.

6. The method of claim 4, wherein the first source access control policy is expressed in a first access control policy language; and wherein the second source access control policy is expressed in a second access control policy language.

7. The method of claim 4, further comprising:
    using differential testing to verify that the first target access control policy is an accurate translation of the first source access control policy; and
    using differential testing to verify that the second target access control policy is an accurate translation of the second source access control policy.

8. The method of claim 4, further comprising:
    compiling, by a first provider network, a third source access control policy into a third target access control policy;
    quotienting, by the first provider network, the third target access control policy to yield a third quotiented target access control policy; and
    using, by the first provider network, an automated reasoning tool to verify the quotiented property against the third quotiented target access control policy.

9. The method of claim 4, wherein quotienting the first target access control policy to yield the first quotiented target access control policy comprises replacing a first identifier of a principal with a second identifier of the principal; and wherein the quotiented property comprises the second identifier of the principal.

10. The method of claim 4, wherein quotienting the first target access control policy to yield the first quotiented target access control policy comprises replacing a first identifier of an action with a second identifier of the action; and wherein the quotiented property comprises the second identifier of the action.

11. The method of claim 4, wherein quotienting the first target access control policy to yield the first quotiented target access control policy comprises replacing a first identifier of a resource with a second identifier of the resource; and wherein the quotiented property comprises the second identifier of the resource.

12. The method of claim 4, wherein the first target access control policy and the second target access control policy are expressed in a same target access control policy language.

13. The method of claim 4, wherein using the automated reasoning tool to verify the quotiented property against the first quotiented target access control policy comprises using a satisfiability modulo theories (SMT) solver tool to verify the quotiented property against the first quotiented target access control policy.

14. The method of claim 4, further comprising:
compiling a third source access control policy into a third target access control policy;
compiling a fourth source access control policy into a fourth target access control policy;
wherein the third source access control policy is modified to yield the fourth source access control policy; and
using differential testing of the third target access control policy and the fourth target access control policy to determine whether the fourth source access control policy is more permissive, less permissive, or equivalent in permissiveness with the third source access control policy.

15. A system comprising:
a first one or more computing devices to implement a multi-provider network access control analyzer service in a provider network, the multi-provider network access control analyzer service including instructions that upon execution cause the multi-provider network access control analyzer service to:
compile a first source access control policy into a first target access control policy;
compile a second source access control policy into a second target access control policy;
quotient the first target access control policy to yield a first quotiented target access control policy, wherein the quotient defines equivalence relations for types of identifiers including at least one of principals, actions, resources, or conditions, such that the equivalence relations group together semantically equivalent ones of the identifiers across different provider networks;
quotient the second target access control policy to yield a second quotiented target access control policy;
use an automated reasoning tool to verify a quotiented property against the first quotiented target access control policy; and
use an automated reasoning tool to verify the quotiented property against the second quotiented target access control policy.

16. The system of claim 15, the multi-provider network access control analyzer service including instructions that upon execution cause the multi-provider network access control analyzer service to:
obtain the first source access control policy from a first provider network; and
obtain the second source access control policy from a second provider network.

17. The system of claim 15, wherein the first source access control policy is expressed in a first access control policy language; and wherein the second source access control policy is expressed in a second access control policy language.

18. The system of claim 15, the multi-provider network access control analyzer service including instructions that upon execution cause the multi-provider network access control analyzer service to:
use differential testing to verify that the first target access control policy is an accurate translation of the first source access control policy; and
use differential testing to verify that the second target access control policy is an accurate translation of the second source access control policy.

19. The system of claim 15, the multi-provider network access control analyzer service including instructions that upon execution cause the multi-provider network access control analyzer service to:
compile, by a first provider network, a third source access control policy into a third target access control policy;
quotient, by the first provider network, the third target access control policy to yield a third quotiented target access control policy; and
use, by the first provider network, an automated reasoning tool to verify the quotiented property against the third quotiented target access control policy.

20. The system of claim 15, wherein instructions that upon execution cause the multi-provider network access control analyzer service to quotient the first target access control policy to yield the first quotiented target access control policy comprise instructions that upon execution cause the multi-provider network access control analyzer service to replace a first identifier of a principal with a second identifier of the principal; and wherein the quotiented property comprises the second identifier of the principal.

\* \* \* \* \*